United States Patent
Venkatraman et al.

(10) Patent No.: US 10,015,728 B2
(45) Date of Patent: Jul. 3, 2018

(54) METHOD AND APPARATUS FOR PERFORMING SCAN OPERATIONS

(71) Applicant: QUALCOMM Incorporated, San Diego, CA (US)

(72) Inventors: Sai Pradeep Venkatraman, Santa Clara, CA (US); Saumitra Mohan Das, Santa Jose, CA (US); Weihua Gao, San Jose, CA (US); Vinay Sridhara, Santa Clara, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/197,517

(22) Filed: Jun. 29, 2016

(65) Prior Publication Data

US 2016/0309406 A1    Oct. 20, 2016

Related U.S. Application Data

(62) Division of application No. 13/797,331, filed on Mar. 12, 2013, now Pat. No. 9,408,136.

(51) Int. Cl.
*H04W 4/00* (2018.01)
*H04W 48/16* (2009.01)
*H04W 52/02* (2009.01)

(52) U.S. Cl.
CPC ....... *H04W 48/16* (2013.01); *H04W 52/0216* (2013.01); *H04W 52/0229* (2013.01); *H04W 52/0245* (2013.01); *Y02D 70/00* (2018.01); *Y02D 70/122* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/26* (2018.01)

(58) Field of Classification Search
CPC ............. H04W 52/0245; H04W 36/06; H04W 52/0229; H04W 8/065
USPC .......................................................... 455/434
See application file for complete search history.

(56) References Cited

U.S. PATENT DOCUMENTS

| | | | |
|---|---|---|---|
| 7,020,439 B2 | 3/2006 | Sinivaara et al. | |
| 8,358,624 B1 | 1/2013 | Ghaus et al. | |
| 2004/0137905 A1 | 7/2004 | Jeong et al. | |
| 2005/0085261 A1 | 4/2005 | Sugaya | |
| 2007/0004402 A1 | 1/2007 | Buckley | |
| 2007/0004404 A1 | 1/2007 | Buckley et al. | |
| 2008/0045210 A1 | 2/2008 | Kaaja et al. | |

(Continued)

FOREIGN PATENT DOCUMENTS

| | | |
|---|---|---|
| EP | 2031927 A1 | 3/2009 |
| EP | 2364048 A1 | 9/2011 |

(Continued)

OTHER PUBLICATIONS

International Search Report and Written Opinion—PCT/US2014/022219—ISA/EPO—Aug. 4, 2014.

*Primary Examiner* — Timothy Pham
(74) *Attorney, Agent, or Firm* — Thien T. Nguyen (57) ABSTRACT

Various methods, apparatuses and/or articles of manufacture are provided which may be implemented for use by a mobile device to alter a scan operation. Various methods, apparatuses and/or articles of manufacture are provided which may be implemented for use by one or more electronic devices to determine one or more scan factors for use by a mobile device in altering a scan operation.

24 Claims, 4 Drawing Sheets

(56) References Cited

U.S. PATENT DOCUMENTS

| | | |
|---|---|---|
| 2009/0296652 A1 | 12/2009 | Rudowicz et al. |
| 2009/0298437 A1 | 12/2009 | Hoefel et al. |
| 2009/0310559 A1 | 12/2009 | Chen et al. |
| 2010/0091657 A1 | 4/2010 | Tsfaty et al. |
| 2010/0157864 A1* | 6/2010 | Salomone ............ H04W 48/16 370/311 |
| 2010/0248715 A1 | 9/2010 | Lundsgaard et al. |
| 2011/0096739 A1 | 4/2011 | Heidari et al. |
| 2011/0110282 A1 | 5/2011 | Wu et al. |
| 2011/0130140 A1 | 6/2011 | Fadell |
| 2011/0159914 A1 | 6/2011 | Chen et al. |
| 2011/0211511 A1 | 9/2011 | Bakthavathsalu et al. |
| 2011/0255478 A1 | 10/2011 | Shen et al. |
| 2012/0112958 A1 | 5/2012 | Alizadeh-Shabdiz et al. |
| 2014/0274040 A1 | 9/2014 | Venkatraman et al. |
| 2014/0334447 A1* | 11/2014 | Kim .................. H04W 36/0055 370/331 |

FOREIGN PATENT DOCUMENTS

| | | |
|---|---|---|
| EP | 2364049 A1 | 9/2011 |
| JP | 2001112046 A | 4/2001 |
| JP | 2005101756 A | 4/2005 |
| JP | 2012523739 A | 10/2012 |
| WO | WO-0049818 A1 | 8/2000 |
| WO | WO-2010117235 A2 | 10/2010 |

* cited by examiner

Determine at least one scan factor (for consideration by a mobile device) based, at least in part, on at least a wireless signal transmitted by a wireless transceiver device
⤷ 302

↓

Transmit a message to a mobile device indicating at least one scan factor
⤷ 312

Determine at least one scan factor (for consideration by a mobile device) based, at least in part, on at least a wireless signal transmitted by a wireless transceiver device Consider a received signal strength measurement for the wireless signal and possibly a signal strength threshold value, and/or consider a determined transmission power and possibly a transmission power threshold value
⤷ 304

Determine a scan factor that various depending upon a location of the mobile device and/or a time measurement
⤷ 306

Determine a scan factor that is indicative of a recommended scan rate frequency and/or a suggested scan limitation
⤷ 308

Consider at least one scan operation report obtained from a mobile device
⤷ 310

⤷ 302

↓

Transmit a message to a mobile device indicating at least one scan factor
⤷ 312

METHOD AND APPARATUS FOR PERFORMING SCAN OPERATIONS

CROSS-REFERENCE TO RELATED APPLICATIONS

This patent application claims the benefit of and priority to co-pending U.S. patent application Ser. No. 13/797,331, filed Mar. 12, 2013, entitled "METHODS AND APPARATUS FOR PERFORMING SCAN OPERATIONS," which is assigned to the assignee hereof and which is incorporated herein by reference in its entirety.

BACKGROUND

1. Field

The subject matter disclosed herein relates to electronic devices, and more particularly to methods, apparatuses and articles of manufacture for use by a mobile device to alter a scan operation, and/or one or more electronic devices to determine one or more scan factors for use by a mobile device in altering a scan operation.

2. Information

As its name implies, a mobile device may be moved about, e.g. typically being carried by a user and/or possibly a machine. By way of some non-limiting examples, a mobile device may take the form of a cellular telephone, a smart phone, a tablet computer, a laptop computer, a wearable computer, a navigation and/or a tracking device, etc.

A mobile device may wish to maintain wireless connectivity to one or more electronic devices as it is moved about. For example, it may be beneficial for a wireless device to maintain wireless connectivity to access various services, such as may be provided by one or more communication and/or computing networks, etc. In another example, it may be beneficial for a mobile device to perform or support various positioning functions based on acquired wireless signals. Consequently, a mobile device may at times perform a scan for wireless signals to acquire.

Unfortunately, a mobile device may, at times, wastefully consume limited computing, memory, and/or available power resources (e.g., from batteries, etc.) scanning for wireless signals.

SUMMARY

In accordance with certain aspects, a method that may be implemented at a mobile device may comprise acquiring at least a first wireless signal transmitted by a wireless transceiver device, and selectively altering at least one subsequent scan operation for wireless signals based, at least in part, on the first wireless signal.

In accordance with certain other aspects, an apparatus that may be provided for use in a mobile device may comprise means for acquiring at least a first wireless signal transmitted by a wireless transceiver device, and means for selectively altering at least one subsequent scan operation for wireless signals based, at least in part, on the first wireless signal.

In accordance with still other aspects, a mobile device may comprise a receiver, and a processing unit to acquire at least a first wireless signal via the receiver from a wireless transceiver device, and selectively alter at least one subsequent scan operation for wireless signals using the receiver based, at least in part, on the first wireless signal.

Accordance with yet another aspect, an article of manufacture may be provided that comprises a non-transitory computer readable medium having stored therein computer implementable instructions executable by a processing unit in a mobile device to acquire at least a first wireless signal transmitted by a wireless transceiver device, and selectively alter at least one subsequent scan operation for wireless signals based, at least in part, on the first wireless signal.

In accordance with a some other aspects, a method that may be implemented at an electronic device may comprise determining at least one scan factor for consideration by a mobile device, the at least one scan factor being based, at least in part, on at least a first wireless signal transmitted by a first wireless transceiver device, and transmitting a message to a mobile device, the at least one message being indicative of the at least one scan factor.

In accordance with yet another aspect, an apparatus that may be provided for use in an electronic device may comprise means for determining at least one scan factor for consideration by a mobile device, the at least one scan factor being based, at least in part, on at least a first wireless signal transmitted by a first wireless transceiver device, and means for transmitting a message to a mobile device, the at least one message being indicative of the at least one scan factor.

In accordance with yet another aspect, a computing platform that may be provided for use in an electronic device may comprise a network interface unit, and a processing unit to determine at least one scan factor for consideration by a mobile device, the at least one scan factor being based, at least in part, on at least a first wireless signal transmitted by a first wireless transceiver device and acquired via the network interface unit, and initiate transmission of a message to a mobile device via the network interface unit, the at least one message being indicative of the at least one scan factor.

In accordance with still other certain aspects, an article of manufacture may be provided which comprises a non-transitory computer readable medium having stored therein computer implementable instructions stored executable by a processing unit of an electronic device to determine at least one scan factor for consideration by a mobile device, the at least one scan factor being based, at least in part, on at least a first wireless signal transmitted by a first wireless transceiver device, and initiate transmission of a message to a mobile device, the at least one message being indicative of the at least one scan factor.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

A mobile device may seek to maintain wireless connectivity to one or more electronic devices as it is moved about. For example, it may be beneficial for a wireless device to maintain wireless connectivity to access various services, such as may be provided by one or more communication and/or computing networks, etc. In another example, it may be beneficial for mobile device to perform or support various positioning functions based on acquired wireless signals. Consequently, a mobile device may at times perform a scan for wireless signals to acquire.

Wireless signal scan operations may, for example, comprise passive scan operations, active scan operations, or some combination thereof. For a passive scan operation, a mobile device may passively receive or attempt to receive wireless signals without transmitting its own wireless signals. For an active scan operation, a mobile device may actively transmit its own wireless signals, e.g., in an attempt to initiate transmission of wireless signals from other electronic devices. As may be appreciated, a mobile device may consume limited computing, memory, and/or available power resources (e.g., batteries, etc.) in performing a scan operation.

In many instances, as a result of a mobile device transmitting wireless signals, an active scan operation or a mixed active/passive scan operation tends to consume more of the available power resources than might a passive scan operation. Hence, it may be beneficial to perform passive scan operations under some circumstances if possible. However, since passive scan operations also tend to consume limited resources it may also be beneficial to, at times, in some way limit or possibly reduce passive scan operations, e.g., to conserve resources, improve efficiency, etc.

Consequently, in accordance with certain aspects of the present description, a mobile device may be provided which acquires at least a first wireless signal transmitted by a wireless transceiver device, and selectively alters at least one subsequent scan operation for wireless signals based, at least in part, on the first wireless signal. As described in greater detail herein, in certain instances the first wireless signal may be indicative of one or more scan factors which may be considered by the mobile device in altering a subsequent scan operation. In certain instances, one or more of such scan operations may comprise a passive scan operation. Indeed, in certain implementations, the techniques herein may be implemented specifically for passive scan operations. However, in certain other implementations, the techniques herein may be implemented for combined passive/active scan operations, or possibly just active scan operations. Hence, unless stated otherwise the term "scan" may apply to a passive scan and/or an active scan.

In certain example implementations, a mobile device may analyze at least the first wireless signal, and selectively alter a subsequent scan operation based, at least in part, on a received signal strength measurement for the first wireless signal, and/or a determined transmission power applied by the wireless transceiver device in transmitting the first wireless signal (e.g., which may be approximated/estimated based on a received signal strength measurement).

In certain example implementations, a mobile device may selectively alter a subsequent scan operation by altering a scan schedule, e.g. based, at least in part, on the first wireless signal. Here, for example, in certain instances a scan schedule may be based, at least in part, on a scan rate (e.g., specifying certain start and stop times, and/or possibly specify a scan rate based on a frequency, a pattern, etc.). Thus, for example, a mobile device may selectively alter a subsequent scan operation by altering a frequency and/or the like of a scan rate. In certain instances, as described herein, a scan factor which may be obtained by the mobile device may indicate a recommended scan rate frequency, e.g., for a particular region and/or location, possibly corresponding to a particular period of time, etc.

In certain implementations, a scan factor which may be obtained by a mobile device may be generated based on feedback obtained from one or more mobile devices, e.g., with regard to their scan operations and/or the like with regard to a particular environment or portion thereof. Accordingly, in certain example implementations, a mobile device may itself transmit a scan operation report to at least one other electronic device. Here, for example, such a scan operation report may be based, at least in part, on one subsequent scan operations which may have been selectively altered by mobile device.

Figure 1:
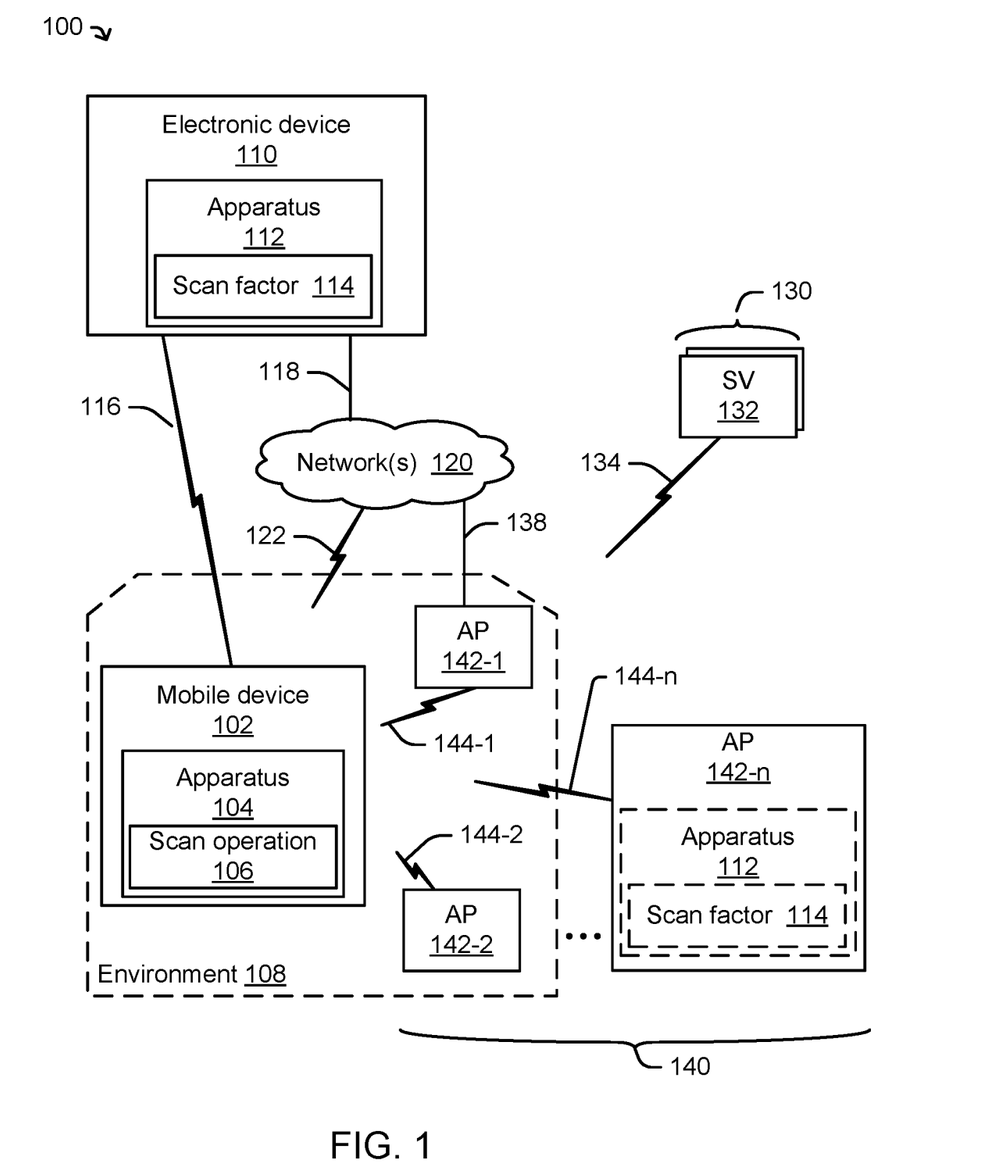
FIG. 1 is a schematic block diagram illustrating an arrangement of representative electronic devices including an electronic device to determine a scan factor, and a mobile device which may alter a subsequent scan operation, e.g., possibly considering a scan factor, in accordance with an example implementation.

With this introduction in mind, attention is now drawn to FIG. 1, which is a schematic block diagram illustrating an example arrangement 100 comprising at least one mobile device 102 having an apparatus 104 capable of selectively altering a (subsequent) scan operation 106. In certain implementations, mobile device 102 may selectively alter scan operation 106 based, at least in part, on one or more scan factors 114 which may be received from an apparatus 112, which may be located in an electronic device 110. As illustrated in FIG. 1, in certain instances electronic device 110 may take the form of a wireless transceiver device, represented here by access point (AP) 142-n.

As shown in arrangement 100, mobile device 102 is illustrated as being located within a particular environment 108. By way of example, as presented herein, particular environment 108 may be representative of at least a portion of an indoor environment, and/or at least a portion of an outdoor environment. Thus, for example, in certain implementations particular environment 108 may represent all or part of a building, a campus, an outdoor mall, a beach/boardwalk, etc., just to name a few examples.

As illustrated in FIG. 1, mobile device 102 may acquire various wireless signals transmitted from various other electronic devices, some of which may be physically located within environment 108 and some of which may be physically located outside of environment 108. In this example, a wireless computing/communication network 140 is represented by plurality of wireless transceiver devices, represented by an AP 142-1 which may transmit wireless signal 144-1, an AP 142-2 which may transmit wireless signal 144-2, . . . , and an AP 142-n which may transmit a wireless signal 144-n, wherein only AP 142-n is illustrated as being located outside of environment 108. In certain implementations, some wireless transceiver devices may transmit wireless signals to one or more other devices and receive wireless signals from one or more other devices. In certain implementations, some wireless transceiver devices may be limited to only transmitting wireless signals. In certain implementations, some wireless transceiver devices may be further coupled to one or more other devices. Here, for example, AP 142-1 is illustrated as having a communication link 138 to network(s) 120. In certain implementations, one or more wireless transceiver devices may be provisioned, at least in part, as part of a terrestrial-based positioning system.

Network(s) 120 is intended to represent all or part of one or more other electronic devices and/or communication facilities/resources capable of supporting wired and/or wireless electronic communication. Thus for example, network(s) 120 may comprise all or part of a telephone network, a cellular telephone network, a wireless communication network, an intranet, the Internet, and/or the like or some combination thereof.

Although communication link 118 between network(s) and electronic device 110 and communication link 138 are illustrated here as representing "wired" communication links it should be understood that in certain instances these communication links may represent one or more wired and/or wireless communication links. Furthermore, it should be understood that a "wired" communication link may comprise electrically conductive wires, cables, etc., and/or similar light or other wavelength conductive members, e.g., fiber-optic cables, waveguides, etc.

As further illustrated, in certain implementations arrangement 100 may comprise one or more space positioning systems (SPS) 130, which may transmit applicable wireless signals that may, at times, be acquired by mobile device 102 and used, at least in part, to support a positioning function. Here, for example, SPS 130 may comprise a plurality of space vehicles (SVs) 132, each of which may transmit one or more SPS signals 134. Further, for example, in certain implementations, a terrestrial positioning system may wireless transceiver devices and/or the like, which may transmit one or more positioning signals (e.g., which may be represented here by wireless signals 144).

Figure 2A:
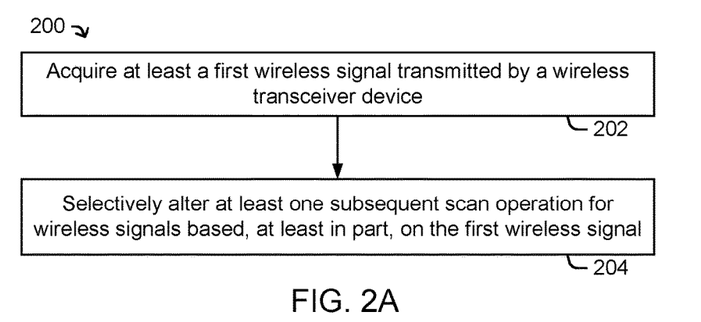
FIG. 2A and FIG. 2B are flow diagrams illustrating example processes that may be implemented within a mobile device to alter a subsequent scan operation, in accordance with certain example implementations.

Attention is drawn next to FIG. 2A, which is a flow diagram illustrating an example process 200 that may be implemented, at least in part, in a mobile device 102 to alter a scan operation 106.

At example block 202, mobile device 102 may acquire at least a first wireless signal transmitted by a wireless transceiver device. Here, for example, in certain implementations mobile device may perform an initial scan operation, e.g., which may comprise a passive scan operation and/or an active scan operation. In certain example implementations, such a first wireless signal may comprise a positioning beacon and/or other like signal which may be useful to a positioning function and/or the like performed by mobile device 102. Thus, for example, in certain implementations a first wireless signal may be indicative of a unique identifier (e.g., a Mac address, etc.) corresponding to the wireless transceiver device.

In some instances, a first wireless signal may be indicative of all or part of a location of the wireless transceiver device, potential services available via the wireless transceiver device (if applicable), possibly other information available regarding all or part of a particular environment 108, and/or the like or some combination thereof.

In some examples, a first wireless signal may be indicative of one or more scan factors 114, which may be considered by apparatus 104 in altering a (subsequent) scan operation 106. In certain implementations, all or part of one or more scan factors 114 may have been generated, at least in part, by the wireless transceiver device. In certain implementations, all or part of one or more scan factors 114 may have been generated, at least in part, by one or more other electronic devices which may be coupled to the wireless transceiver device.

At example block 204, device 102 may selectively alter at least one subsequent scan operation 106 through which the mobile device may search for and/or possibly attempt to acquire one or more additional wireless signals. Here, for example, device 102 may selectively alter at least one subsequent scan operation 106 based, at least in part, on the first wireless signal.

Figure 2B:
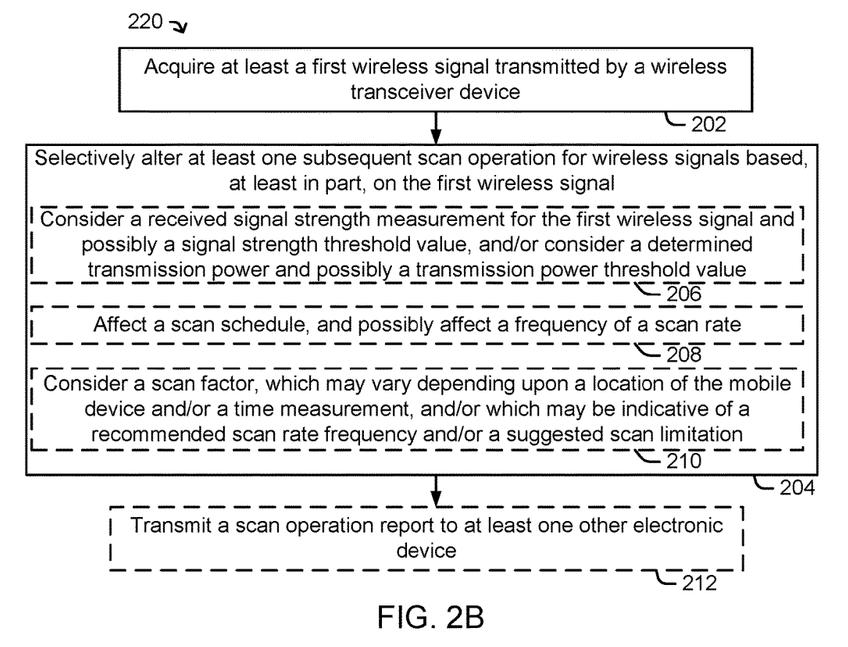

Attention is drawn next to FIG. 2B, which is a flow diagram illustrating an example process 220 that may be implemented, at least in part, in a mobile device 102 to alter a scan operation 106.

As with process 200, at example block 202 mobile device 102 may acquire at least a first wireless signal transmitted by a wireless transceiver device, and at example block 204 device 102 may selectively alter at least one subsequent scan operation 106 through which the mobile device may search for and/or possibly attempt to acquire one or more additional wireless signals.

At example block 206 mobile device 102 may selectively alter at least one subsequent scan operation 106 based, at least in part, on a received signal strength measurement which may be determined by the mobile device for at least the first wireless signal. In certain instances, such a received signal strength measurement may be considered along with a corresponding signal strength threshold value, e.g. to determine whether and/or how much to alter a subsequent scan operation 106. Similarly in certain instances, at block 206 mobile device 102 may selectively alter at least one subsequent scan operation 106 based, at least in part, on a determined transmission power which may be determined by the mobile device for at least the first wireless signal and/or at least the first wireless transceiver device. For example, in certain instances a transmission power may be indicated in a an AP broadcast, etc. In another example, a transmission power may be determined based, at least in part, by a comparison of a measured RSSI and an expected RSSI (e.g., for known locations). In some examples, such a determined transmission power may be considered along with a corresponding transmission power threshold value, e.g. to determine whether and/or how much to alter a subsequent scan operation 106.

By way of yet another example, at block 208, mobile device 102 may selectively alter at least one subsequent scan operation 106, at least in part, by altering (e.g., modifying, changing, adding to, deleting from, establishing, generating, etc.) a scan schedule. For example, a scan schedule may indicate start and stop times for subsequent scan operations, and thus by changing one or more start or stop times mobile device 102 may selectively alter at least one subsequent scan operation 106 via such scan schedule By way of still further example, at block 208, in certain instances a scan schedule may be based, at least in part, on a scan rate, and a mobile device may selectively alter at least one scan operation 106 by altering a frequency of such a scan rate. For example, in certain instances mobile device 102 may increase such a frequency in response to determining that a received signal strength measurement for a first wireless signal does not satisfy a signal strength threshold value. Conversely, in certain instances mobile device 102 may decrease such a frequency in response to determining that the received signal strength measurement satisfies such a signal strength threshold value. Similarly, in certain instances mobile device 102 may increase such a frequency in response to determining that a determined transmission power applied by a wireless transceiver device in transmitting a first wireless signal does not satisfy a transmission power threshold value. Conversely, in certain instances mobile device 102 may decrease such a frequency in response to determining that the determined transmission power satisfies such a transmission power threshold value. In certain other instances, mobile device 102 may decrease such a frequency in response to and/or otherwise based, at least in part, on a comparison of a number of wireless transceiver devices identified (e.g., based on a default scan rate) to an expected number of wireless transceiver devices (e.g., based on a heatmap). In certain example implementations, a scan rate may be synchronized or otherwise offset in some manner to a position fix rate (e.g., specifying how often position fixes may be computed, possibly transmitted, etc.). By way of example, if a position fix rate is ten seconds, it may be beneficial for a scan rate to initiate a scan slightly in advance of a scheduled position fix. However, in certain instances if a position fix rate is one second, it may be beneficial for a scan rate to initiate a scan in advance of each $n^{th}$ (e.g., fifth) scheduled position fix.

In some examples, at example block 210, a mobile device 102 may selectively alter at least one subsequent scan operation 106 based, at least in part, on one or more scan factors 114, which may be received from one or more other electronic devices. For example, in certain instances all or part of one or more scan factors 114 may be obtained via the first wireless signal acquired at block 202. In certain other instances, all or part of one or more scan factors 114 may be obtained via one or more other wireless signals and/or messages carried thereon. Indeed, in certain instances it may be possible for mobile device 102 to obtain all or part of one or more scan factors 114 from one or more other mobile devices. Further still, in certain instances all or part of one or more scan factors 114 may be obtained along with various types of navigation assistance data, and/or the like.

A scan factor 114 may, for example, provide information about one or more wireless transceiver devices which may be of use, at least in part, to a mobile device. For example, in certain instances a scan factor 114 may identify one or more wireless transceiver devices that may be nearby mobile device 102, and/or may indicate certain parameters which may be considered in attempting to acquire wireless signals from such wireless transceiver devices, e.g. as part of a subsequent altered scan operation 106. By way of example, in certain instances a scan factor 114 may identify particular frequencies, frequency bands, channels, etc., based on which mobile device 102 may tune its receiver(s) in an attempt to acquire wireless signals from such wireless transceiver devices.

In certain instances, at block 210, a scan factor 114 which may be considered, may vary depending upon a location of the mobile device, some time measurement, and/or the like or some combination thereof. Thus, for example, in certain instances a scan factor 114 may be applicable for certain regions within an environment, e.g., a particular office suite, a particular floor of the building, a particular building, a particular campus, a particular region identifiable by a location context identifier (LCI) and/or the like, which may correspond to different operating modes/settings, availability/unavailability, etc., of one or more wireless transceiver devices. Similarly, for example, in certain instances a scan factor 114 may be applicable to a time measurement indicative of certain dates, days of the week, times of day, and/or the like, which may correspond to different operating modes/settings, availability/unavailability, etc., of one or more wireless transceiver devices.

In certain instances at block 210, a scan factor 114 may be indicative of a recommended scan rate frequency and/or the like, which may be considered by mobile device 102 in selectively altering scan operation 106. For example, in certain implementations a scan factor 114 may be based, at least in part, on information gathered via a plurality of scan operation reports from a plurality of mobile devices with regard to a particular environment 108. Indeed, in certain instances a scan operation report may be indicative of an altered subsequent scan operation made by other mobile devices, or possibly certain decision factors and/or available information used by other mobile devices regarding subsequent scan operations, whether such subsequent scan operations proved beneficial or detrimental, etc.

Accordingly, an apparatus 112 may consider variety of historical information and/or gathered knowledge regarding scanning within a particular environment or portion thereof. Hence, for example, in certain instances, a scan factor 114 may indicate a particular scan frequency which may be considered by an apparatus 104 in mobile device 102.

Indeed, in certain implementations, a scan factor 114 may take a form that may be similar to a probability radio signal heatmap in that different scan factors (e.g., scan frequencies, etc.) may be specified by way of various distances, locations, etc. associated with the particular environment. For example, in certain instances a linear function or a discrete function may be used to indicate a scan frequency as a function of distance from a particular point (e.g., a default reference point, a location of a wireless transceiver device, etc.) and/or as a function of specified locations within a particular environment (e.g., a grid coordinate, a room identifier, etc.).

In certain instances at block 210, a scan factor 114 may be indicative of a suggested scan limitation. Here, for example, in certain instances a suggested scan limitation may be indicative of one or more conditional aspects associated with a scan factor 114. In certain instances, a suggested scan limitation may be indicative of one or more signal frequencies, signal frequency bands, channels, etc., which may be associated with particular wireless transceiver devices and/or certain corresponding wireless signals which may be of use to mobile device 102. Conversely, in certain instances a suggested scan limitation may be indicative of one or more signal frequencies, signal frequency bands, channels, etc., that may be skipped over, avoided, etc., in one or more subsequent scan operations. In certain instances, a suggested scan limitation may be indicative of a transmit power, an antenna selection, a protocol, a message, etc., that may be applied in one or more (active) scan operations.

In certain instances mobile device 102, at block 204, may selectively alter a subsequent scan operation 106 based, at least in part, on a suggested scan limitation. By doing so, in certain implementations mobile device 102 may be able to avoid wasting time and/or resources performing passive scans and/or possibly active scans for wireless signal/transmitters which may simply not be available within a particular environment and/or portion thereof. Hence, scan factor 114 may allow mobile device to make more informed decisions as to when and/or how best to perform scan operations.

Example block 212 may be optional, as may be other blocks in the example processes of FIG. 2 and FIG. 3 which are drawn using dashed line boxes. At example block 212, a mobile device 102 may transmit a scan operation report to at least one other electronic device. Thus, for example, via example block 212 mobile device 102 may participate in crowd-sourcing and/or otherwise simply providing feedback indicative of various information corresponding to all or part of a particular environment 108 and relating to scan operations, and/or the like which may have been considered and/or applied by mobile device 102. Indeed, as mentioned, in certain instances it may be beneficial for an apparatus 112 to obtain a plurality of scan operation reports and/or the like that may be analyzed and/or otherwise processed in some manner to alter one or more scan factors 114, which may then be provided to one or more mobile devices prior to and/or while navigating within all or part of particular environment 108.

Figure 3A:
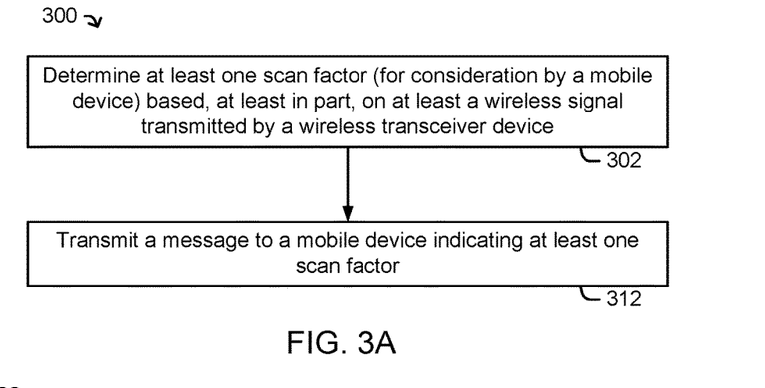
FIG. 3A and FIG. 3B are flow diagrams illustrating example processes that may be implemented within an electronic device to determine a scan factor which may be considered by a mobile device in altering a subsequent scan operation, in accordance with certain example implementations.

Attention is drawn next to FIG. 3A, which is a flow diagram illustrating an example process 300 that may be implemented, at least in part, in an electronic device 110 and/or other like device comprising apparatus 112 to generate a scan factor 114.

At example block 302, apparatus 112 may determine at least one scan factor 114 (e.g., for consideration by a mobile device 102) based, at least in part, on at least a wireless signal transmitted by a wireless transceiver device. Thus, in certain implementations, apparatus 112 may be provisioned in one or more wireless transceiver devices, and/or the like, which may be arranged physically within and/or physically outside (e.g., possibly physically nearby) of a particular location 108. Apparatus 112 may, therefore, in certain instances acquire various wireless signals transmitted by other wireless transceiver devices, e.g., possibly in similar manner as might a mobile device. Consequently, apparatus 112 may learn information about one or more neighboring wireless transceiver devices, which may be considered in determining at least one scan factor 114. Example, in certain instances apparatus 112 may generate one or more scan factors 114 to identify one or more neighboring wireless transceivers devices, and/or signals transmitted thereby, and/or other factors/conditions corresponding thereto.

At example block 312, apparatus 112 initiate transmission of one or more messages (directly and/or indirectly) to a mobile device indicating at least one scan factor. In certain instances, apparatus 112 may initiate transmission of such message(s) via one or more signals broadcast, e.g., from time to time, for reception by any listening mobile devices and/or other electronic devices. In certain instances, apparatus 112 may transmit such message(s) to one or more particular mobile devices, e.g., in response to a request for scan factors, and/or other like assistance data (e.g., corresponding to all or part of a particular environment 108).

Figure 3B:
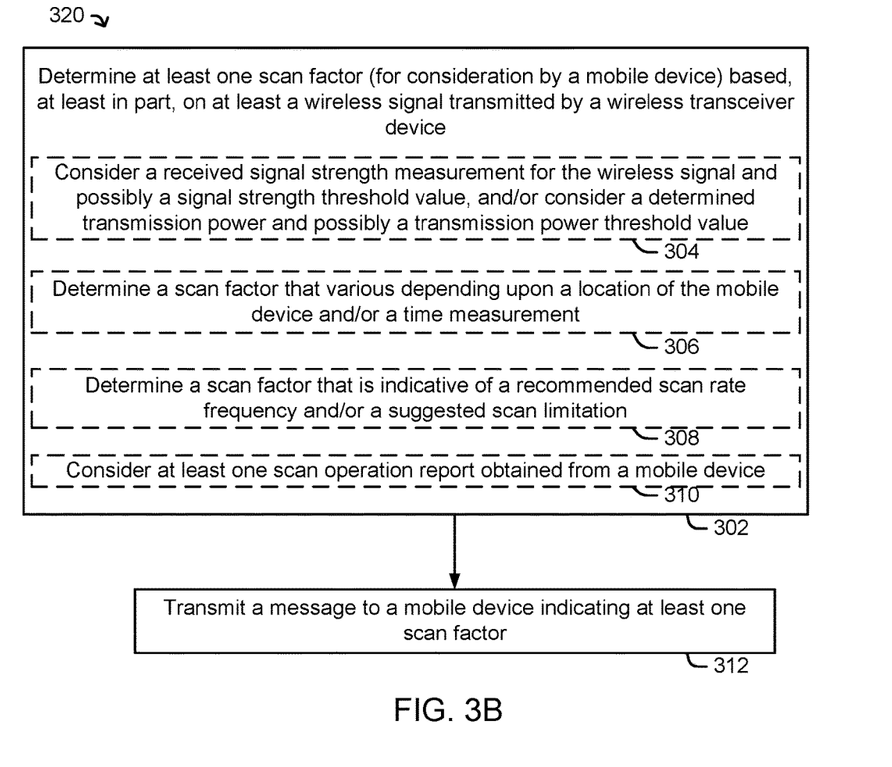

Attention is drawn next to FIG. 3B, which is a flow diagram illustrating an example process 320 that may be implemented, at least in part, in an electronic device 110 and/or other like device comprising apparatus 112 to generate a scan factor 114.

At example block 302, apparatus 112 may determine at least one scan factor 114 (e.g., for consideration by a mobile device 102) based, at least in part, on at least a wireless signal transmitted by a wireless transceiver device. Thus, in certain implementations, apparatus 112 may be provisioned in one or more wireless transceiver devices, and/or the like, which may be arranged physically within and/or physically outside (e.g., possibly physically nearby) of a particular location 108. Apparatus 112 may, therefore, in certain instances acquire various wireless signals transmitted by other wireless transceiver devices, e.g., possibly in similar manner as might a mobile device. Consequently, apparatus 112 may learn information about one or more neighboring wireless transceiver devices, which may be considered in determining at least one scan factor 114. Example, in certain instances apparatus 112 may generate one or more scan factors 114 to identify one or more neighboring wireless transceivers devices, and/or signals transmitted thereby, and/or other factors/conditions corresponding thereto.

Accordingly, in certain example implementations, at example block 304, apparatus 112 may determine one or more scan factors based, at least in part, by considering a received signal strength measurement for a wireless signal and possibly a signal strength threshold value, and/or consider a determined transmission power and possibly a transmission power threshold value.

In certain example implementations, at example block 306, apparatus 112 may determine one or more scan factors which may be conditional and/or otherwise dependent upon a location of the mobile device and/or some time measurement, several examples of which have been previously described.

In certain example implementations, at example block 308, apparatus 112 may determine a scan factor that is indicative of a recommended scan rate frequency and/or a suggested scan limitation, several examples of which have been previously described.

In certain example implementations, at block 310, apparatus 112 may determine a scan factor based, at least in part, by considering at least one scan operation report, e.g. which may be obtained from a mobile device. Indeed, as previously mentioned, in certain instances a plurality of scan operation reports from a plurality of mobile devices may be analyzed and/or otherwise considered in generating a scan factor.

At example block 312, apparatus 112 initiate transmission of one or more messages (directly and/or indirectly) to a mobile device indicating at least one scan factor. In certain instances, apparatus 112 may initiate transmission of such message(s) via one or more signals broadcast, e.g., from time to time, for reception by any listening mobile devices and/or other electronic devices. In certain instances, apparatus 112 may transmit such message(s) to one or more particular mobile devices, e.g., in response to a request for scan factors, and/or other like assistance data (e.g., corresponding to all or part of a particular environment 108).

Figure 4:
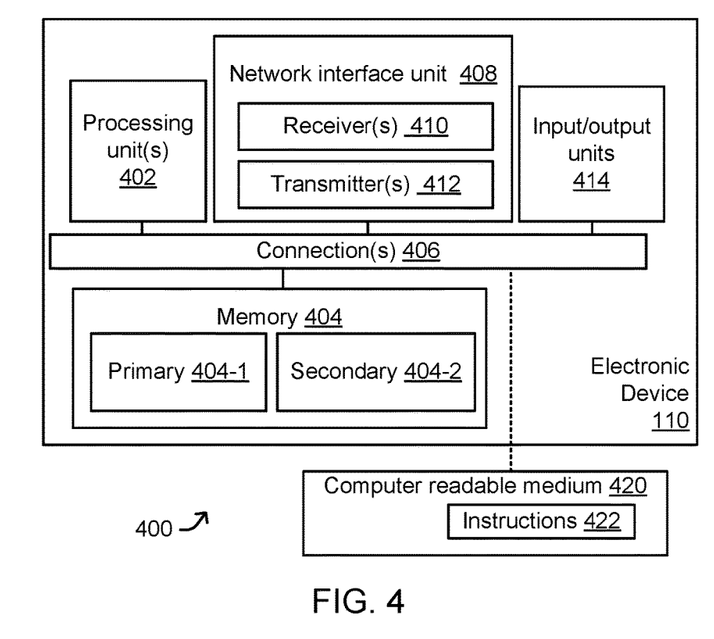
FIG. 4 is a schematic diagram illustrating certain features of an example electronic device to determine a scan factor which may be considered by a mobile device in altering a subsequent scan operation, in accordance with an example implementation.

Attention is now drawn to FIG. 4, which is a schematic block diagram illustrating certain features of an example special computing platform 400 which may be provided as part of electronic device 110, and/or apparatus 112 provisioned therein. In certain implementations, electronic device 110 may take the form of a wireless transceiver device, e.g., such as, an access point and/or the like.

As illustrated special computing platform 400 may comprise one or more processing units 402 (e.g., to perform data processing in accordance with the techniques provided herein, apparatus 112) coupled to memory 404 via one or more connections 406 (e.g., one or more electrical conductors, one or more electrically conductive paths, one or more buses, one or more fiber-optic paths, one or more circuits, one or more buffers, one or more transmitters, one or more receivers, etc.). Processing unit(s) 402 may, for example, be implemented in hardware or a combination of hardware and software. Processing unit(s) 402 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 404 may be representative of any data storage mechanism. Memory 404 may include, for example, a primary memory 404-1 and/or a secondary memory 404-2. Primary memory 404-1 may comprise, for example, a random access memory, read only memory, etc. While illustrated in this example as being separate from the processing units, it should be understood that all or part of a primary memory may be provided within or otherwise co-located/coupled with processing unit(s) 402, or other like circuitry within electronic device 110. Secondary memory 404-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-blended computer readable medium 420. Memory 404 and/or non-blended computer readable medium 420 may comprise instructions 422 for use in performing data processing, e.g., in accordance with the applicable techniques as provided herein.

Special computing platform 400 may, for example, further comprise one or more network interface unit(s) 408. Network interface unit(s) 408 may, for example, comprise one or more wired and/or wireless communication interfaces, represented here by one or more receivers 410 and one or more transmitters 412. It should be understood that in certain implementations, communication interface 408 may comprise one or more transceivers, and/or the like. Further, it should be understood that although not shown, communication interface 408 may comprise one or more antennas and/or other circuitry as may be applicable given the communication interface function/capability.

In accordance with certain example implementations, network interface unit(s) 408 may, for example, be enabled for use with various wired communication networks, e.g., such as telephone system, a local area network, a wide area network, a personal area network, an intranet, the Internet, etc.

Accordance with certain example implementations network interface unit(s) 408 and/or 508 (see FIG. 5) may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 408 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN.

Electronic device 110 may, for example, further comprise one or more input/output units 414. Input/output units 414 may represent one or more devices or other like mechanisms that may be used to obtain inputs from and/or provide outputs to one or more other devices and/or a user. Thus, for example, input/output units 414 may comprise various buttons, switches, a touch pad, a trackball, a joystick, a touch screen, a keyboard, and/or the like, which may be used to receive one or more user inputs. In certain instances, input/output units 414 may comprise various devices that may be used in producing a visual output, an audible output, and/or a tactile output for a user. For example, input/output units 414 may be used to present a video display, graphical user interface, etc., on a display mechanism.

Figure 5:
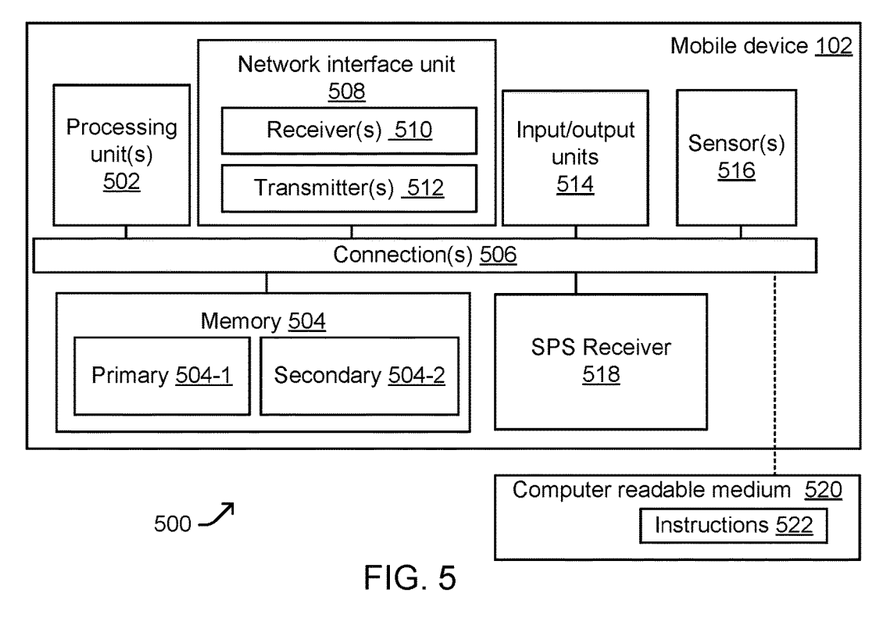
FIG. 5 is a schematic diagram illustrating certain features of an example mobile device which may alter a subsequent scan operation, in accordance with an example implementation.

Attention is now drawn to FIG. 5, which is a schematic block diagram illustrating certain features of an example special computing platform 500 which may be provided as part of mobile device 102, and/or apparatus 104 provisioned therein.

As illustrated special computing platform 500 may comprise one or more processing units 502 (e.g., to perform data processing in accordance with the techniques provided herein, apparatus 104) coupled to memory 504 via one or more connections 506 (e.g., one or more electrical conductors, one or more electrically conductive paths, one or more buses, one or more fiber-optic paths, one or more circuits, one or more buffers, one or more transmitters, one or more receivers, etc.). Processing unit(s) 502 may, for example, be implemented in hardware or a combination of hardware and software. Processing unit(s) 502 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 504 may be representative of any data storage mechanism. Memory 504 may include, for example, a primary memory 504-1 and/or a secondary memory 504-2. Primary memory 504-1 may comprise, for example, a random access memory, read only memory, etc. While illustrated in this example as being separate from the processing units, it should be understood that all or part of a primary memory may be provided within or otherwise co-located/coupled with processing unit(s) 502, or other like circuitry within mobile device 102. Secondary memory 504-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-blended computer readable medium 520. Memory 504 and/or non-blended computer readable medium 520 may comprise instructions 522 for use in performing data processing, e.g., in accordance with the applicable techniques as provided herein.

Special computing platform 500 may, for example, further comprise one or more network interface units 508. Network interface unit 508 may, for example, comprise one or more wired and/or wireless communication interfaces, represented here by one or more receivers 510 and one or more transmitters 512. It should be understood that in certain implementations, network interface unit 508 may comprise one or more transceivers, and/or the like. Further, it should be understood that although not shown, network interface unit 508 may comprise one or more antennas and/or other circuitry as may be applicable given the communication interface function/capability.

In accordance with certain example implementations, network interface unit 508 may, for example, be enabled for use with various wired communication networks, e.g., such as telephone system, a local area network, a wide area network, a personal area network, an intranet, the Internet, etc.

Mobile device 102 may, for example, further comprise one or more input/output units 514. Input/output units 514 may represent one or more devices or other like mechanisms that may be used to obtain inputs from and/or provide outputs to one or more other devices and/or a user. Thus, for example, input/output units 514 may comprise various buttons, switches, a touch pad, a trackball, a joystick, a touch screen, a keyboard, a microphone, a camera, and/or the like, which may be used to receive one or more user inputs. In certain instances, input/output units 514 may comprise various devices that may be used in producing a visual output, an audible output, and/or a tactile output for a user. For example, input/output units 514 may be used to present a video display, graphical user interface, positioning and/or navigation related information, visual representations of electronic map, routing directions, etc., via a display mechanism and/or audio mechanism.

Mobile device 102 may, for example, comprise one or more sensors 516. For example, sensor(s) 516 may represent one or more environmental sensors, which may be useful in measuring certain atmospheric or other like phenomena which may occur in a particular environment 108. For example, sensor(s) 516 may represent one or more inertial sensors, which may be useful in detecting certain aspects of a particular environment 108 and/or movements of mobile device 102 therein. Thus for example, sensor(s) 516 may comprise one or more accelerometers, one or one or more gyroscopes or gyrometers, one or more magnetometers and/or the like, one or more barometers, one or more thermometers, one or more particle detectors, etc. Further, in certain instances sensor(s) 516 may comprise and/or take the form of one or more input devices such as a microphone, a camera, a light sensor, etc.

SPS receiver 518 may be capable of acquiring and acquiring wireless signals 134 via one or more antennas (not shown). SPS receiver 518 may also process, in whole or in part, acquired wireless signals 134 for estimating a position and/or a motion of mobile device 102. In certain instances, SPS receiver 518 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of mobile device 102. In certain implementations, all or part of such processing of acquired SPS signals may be performed by other processing capabilities in mobile device 102, e.g., processing unit(s) 502, memory 504, etc., in conjunction with SPS receiver 518. Storage of SPS or other signals for use in performing positioning operations may be performed in memory 504 or registers (not shown).

In certain instances, sensor(s) 516 may generate analog or digital signals that may be stored in memory 504 and processed by DPS(s) (not shown) or processing unit(s) 502 in support of one or more applications such as, for example, applications directed to positioning or navigation operations based, at least in part, on one or more positioning functions.

Processing unit(s) 502 may comprise a dedicated modem processor or the like that may be capable of performing baseband processing of signals acquired and downconverted at receiver(s) 510 of network interface unit 508 or SPS receiver 509. Similarly, a modem processor or the like may perform baseband processing of signals to be upconverted for transmission by (wireless) transmitter(s) 512. In alternative implementations, instead of having a dedicated modem processor, baseband processing may be performed by a general purpose processor or DSP (e.g., general purpose/application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

In accordance with certain example implementations, a wireless transceiver device may comprise an IEEE std. 802.11 access point (AP), which may transmit a periodic beacon signal to, for example, enable mobile devices in range of the wireless transceiver device to request service access. For example, a mobile device wishing to send data may initiate a process to obtain access to certain wireless transceiver devices by transmitting a Request to Send frame (RTS) to the wireless transceiver device. The recipient wireless transceiver device may then reply with a Clear To Send frame (CTS). To acquire the CTS, the mobile device may tune its receiver to "listen" on a particular transmission frequency being applied by the wireless transceiver device to transmit the CTS.

In particular operational applications, such as acquisition of a CTS, it may be useful for a mobile device to identify particular wireless transceiver device by, for example, a unique identifier such as a MAC address, etc. To enable efficient acquisition of a (beacon) wireless signal transmitted by wireless transceiver devices, it may further be useful for such a mobile device to know particular frequency channels on which wireless transceiver devices are transmitting. For example, a mobile device may maintain a record of wireless transceiver devices in range including, for example, a MAC address and frequency channel on which the wireless transceiver device is currently transmitting a beacon signal. As previously described, in certain implementations, a mobile device may passively scan for wireless transceiver devices. In one example, such a scan operation may be performed, at least in part, by altering a receiver in the mobile device to set a frequency channel being scanned and wait for a periodic beacon signal from any wireless transceiver devices configured to use such frequency channel. In certain example implementations, a wireless transceiver device may transmit a beacon signal every 100 ms. Unfortunately, as mentioned, excessive scanning may be undesirable since such tends to consume limited resources.

As previously described, in certain example implementations a mobile device may alter a subsequent scan operation in a manner such that a rate at which it passively scans for detection/acquisition of wireless signal transmitted changes. By way of example, a mobile device may alter a subsequent scan operation based, at least in part, on determined transmission power of one or more wireless transceiver devices. This may reduce unnecessary scanning that may deplete a battery, and/or otherwise affect efficiency of. In certain example implementations, a mobile device may evaluate a minimum received signal strength indications (RSSI) of wireless signals acquired from wireless transceiver devices and infer a transmission power. In one implementation, a mobile device may define multiple discrete power levels, such as power levels 1-7 with level 1 being the strongest and level 10 being the weakest. The mobile communication device may then apply the following process to determining a scan rate: AP transmits at power levels 1-3 (strong), scan once every 10 s; AP transmits at power levels 4-6, scan once every 6 s; AP transmits at levels 7 and below (weak), scan once every 3 s (e.g., level may be based on a minimum RSSI, transmission, etc., from scanned APs).

Alternately, if transmission power is not known or difficult to infer and if positions of wireless transceiver devices are known relative to mobile device position, if the strongest AP is heard with RSSI<Thr (−60 dB) this may mean that AP transmission power is low and the mobile device may increase the frequency of subsequent scan operations. In yet another alternative, an RTS/CTS sequence may be performed for all APs within a certain radius of the mobile device position.

In yet another implementation, an apparatus 112 (e.g. which may provisioned, at least in part, in an AP) may listen and discover beacons of other local or adjacent APs and transmit frequency channels and identities of the discovered beacons on its beacon, e.g., as one or more scan factors 114. A mobile device 102 acquiring the discovering AP's beacon may then determine the identities of local APs and the frequency channels on which the local APs are transmitting their respective beacon signals.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at an electronic device:
    receiving at least one scan operation report from one or more mobile devices, said at least one received scan operation report indicating that one or more scan operations has been altered by at least one mobile device of said one or more mobile devices;
    determining at least one scan factor based, at least in part, on at least a first wireless signal transmitted by a first wireless transceiver device, said at least one scan operation report and a rate of scheduled position fixes of a particular mobile device; and
    transmitting at least one message to said particular mobile device, said at least one message being indicative of said at least one scan factor.

2. The method as recited in claim 1, wherein said at least one scan factor is additionally based, at least in part, on: a received signal strength measurement for said first wireless signal or a determined transmission power applied by said first wireless transceiver device in transmitting said first wireless signal, or a combination thereof.

3. The method as recited in claim 1, wherein said at least one scan factor varies depending upon a location of said particular mobile device, or a time measurement, or a combination thereof.

4. The method as recited in claim 1, wherein said at least one scan factor is indicative of: a recommended scan rate frequency or a suggested scan limitation, or a combination thereof.

5. The method as recited in claim 1, wherein said at least one scan operation report is additionally based
    on at least one subsequent scan operation selected by said at least one mobile device while located within a coverage area associated with said first wireless transceiver device.

6. The method as recited in claim 1, wherein said at least one scan factor corresponds to a passive scan operation.

7. An apparatus for use in an electronic device, said apparatus comprising:
    means for receiving at least one scan operation report from one or more mobile devices, said at least one received scan operation report indicating scan operations has been altered by at least one mobile device of said one or more mobile devices;
    means for determining at least one scan factor, said at least one scan factor being based, at least in part, on at least a first wireless signal transmitted by a first wireless transceiver device, said at least one scan operation report and a rate of scheduled position fixes of a particular mobile device; and
    means for transmitting at least one message to said particular mobile device, said at least one message being indicative of said at least one scan factor.

8. The apparatus as recited in claim 7, wherein said at least one scan factor is additionally based, at least in part, on: a received signal strength measurement for said first wireless signal or a determined transmission power applied by said first wireless transceiver device in transmitting said first wireless signal, or a combination thereof.

9. The apparatus as recited in claim 7, wherein said at least one scan factor varies depending upon a location of said particular mobile device or a time measurement, or a combination thereof.

10. The apparatus as recited in claim 7, wherein said at least one scan factor is indicative of: a recommended scan rate frequency or a suggested scan limitation, or a combination thereof.

11. The apparatus as recited in claim 7, wherein and further comprising:
    said at least one scan operation report is additionally based on at least one subsequent scan operation selected by said at least one mobile device while located within a coverage area associated with said first wireless transceiver device.

12. The apparatus as recited in claim 7, wherein said at least one scan factor corresponds to a passive scan operation.

13. A computing platform for use in an electronic device, said computing platform comprising:
    a network interface unit configured to acquire a first wireless signal transmitted by a first wireless transceiver device, and transmit a message to one or more mobile devices; and
    a processing unit coupled to said network interface unit and configured to:
    obtain at least one scan operation report received from said one or more mobile devices, said at least one scan operation report indicating that one or more scan operations has been altered by at least one mobile device of said one or more mobile devices;
    determine at least one scan factor, said at least one scan factor based, at least in part, on said first wireless signal, said at least one scan operation report and a rate of scheduled position fixes of a particular mobile device; and
    initiate transmission of said message to said particular mobile device via said network interface unit, said message being indicative of said at least one scan factor.

14. The computing platform as recited in claim 13, wherein said at least one scan factor is additionally based, at least in part, on:
    a received signal strength measurement for said first wireless signal or a determined transmission power applied by said first wireless transceiver device in transmitting said first wireless signal, or a combination thereof.

15. The computing platform as recited in claim 13, wherein said at least one scan factor varies depending upon a location of said particular mobile device or a time measurement, or a combination thereof.

16. The computing platform as recited in claim 13, wherein said at least one scan factor is indicative of: a recommended scan rate frequency or a suggested scan limitation, or a combination thereof.

17. The computing platform as recited in claim 13, wherein said at least one scan operation report is additionally based
    on at least one subsequent scan operation selected by said at least one mobile device while located within a coverage area associated with said first wireless transceiver device.

18. The computing platform as recited in claim 13, wherein said at least one scan factor corresponds to a passive scan operation.

19. An article comprising:
    a non-transitory computer readable medium having stored thereon computer implementable instructions stored executable by a processing unit of an electronic device to:

obtain at least one scan operation report received from one or more mobile devices, said at least one scan operation report indicating that one or more scan operations has been altered by at least one mobile device of said one or more mobile devices;

determine at least one scan factor, said at least one scan factor being based, at least in part, on at least a first wireless signal transmitted by a first wireless transceiver device, said at least one scan operation report and a rate of scheduled position fixes of a particular mobile device; and initiate transmission of at least one message to said particular mobile device, said at least one message being indicative of said at least one scan factor.

20. The article as recited in claim 19, wherein said at least one scan factor is additionally based, at least in part, on: a received signal strength measurement for said first wireless signal or a determined transmission power applied by said first wireless transceiver device in transmitting said first wireless signal, or a combination thereof.

21. The article as recited in claim 19, wherein said at least one scan factor varies depending upon a location of said particular mobile device or a time measurement, or a combination thereof.

22. The article as recited in claim 19, wherein said at least one scan factor is indicative of: a recommended scan rate frequency or a suggested scan limitation, or a combination thereof.

23. The article as recited in claim 19, wherein said at least one scan operation report is additionally based
on at least one subsequent scan operation selected by said at least one mobile device while located within a coverage area associated with said first wireless transceiver device.

24. The article as recited in claim 19, wherein said at least one scan factor corresponds to a passive scan operation.

* * * * *